Patented July 6, 1948

2,444,875

UNITED STATES PATENT OFFICE 2,444,875

FOOD PRESERVING

Elsie A. Hayes, South Euclid, Ohio

No Drawing. Application June 26, 1946,
Serial No. 679,557

8 Claims. (Cl. 99—156)

This invention relates as indicated to food preserving, and more particularly to a new method and composition for preserving peppers (of the Capsicum family) alone or in combination with other foods, and to such foods thus preserved.

It has long been known to preserve or "pickle" fruits and vegetables by soaking in brine solutions or heating and sealing them in a liquid composition consisting primarily of a vinegar and sugar mixture to which various well known flavoring ingredients may be added. Small amounts of various other additives are often included to inhibit spoilage and souring of the food stuffs thus preserved, such additives including sodium nitrite, benzoate of soda and alum. These last named ingredients are not generally considered beneficial to the health of the consumer so that only very small quantities may be employed.

When fruits and vegetables are preserved in the manner described above it has been found that after a period of time certain of them, particularly peppers, tend to soften and lose the firm texture desired by the buying public. In fact, pickled peppers are often removed from the market by the supplier if not sold within a period of some few months since it has been found injurious to the reputation of the supplier to retail products of this type which have become soft and flabby upon standing. Often such deterioration will take place within as little as three months time, even when the jars have been kept sealed, although the product may otherwise remain entirely fit for human consumption. As a result, there are at present on the market relatively small quantities of pickles or preserved foods containing peppers.

It is therefore a primary object of my invention to provide a method of preserving fruits of the Capsicum family, especially red peppers, green peppers, and pimentos, whether hot (to the taste) or mild, which will cause such food stuffs to remain firm and attractive over a long period of time.

It is another object of my invention to provide a food preserving composition which will be effective to preserve such food stuffs for an indefinite period of time when put up cold and which will not permit early spoilage even after the jar in which the same is contained has been opened.

A further object of my invention is to provide such composition which shall contain no harmful ingredients but which will on the contrary be more healthful than those compositions now on the market.

Still another object is to provide a method of preserving such food stuffs which is simple and inexpensive and does not necessitate the heating or cooking of the various ingredients.

An additional object is to provide a new foodstuff of desirable characteristics.

Other objects of my invention will appear as the description proceeds.

To the accomplishment of the foregoing and related ends, said invention, then, consists of the steps hereinafter fully described and particularly pointed out in the claims.

The following description sets forth in detail one approved method of carrying out the invention, such disclosed method, however, constituting but one of the various ways in which the principle of the invention may be used.

I have found that if in the preparation of pickled peppers and the like I employ a small amount of saccharine (o-sulfobenzoic acid imide) in the composition in the manner described below, the peppers will retain their firm texture and may be preserved indefinitely. More particularly, I employ a solution of sugar and salt in cider vinegar as the basis for my preserving composition to which other flavoring materials such as mustard may be added. A small amount of saccharine is incorporated with these ingredients in cold solution and the pimentos, sweet peppers, hot peppers, and the like, are immersed therein, it merely being necessary to see to it that there is sufficient of the liquid to cover the same. Peppers may be thus preserved in the usual glass jars for an indefinite period without refrigeration or other special care, although such jars will of course preferably be sealed with glass covers. Even after opening, however, it has been found that peppers thus preserved will keep for a long period of time as long as there is sufficient of the liquid to cover them.

A preferred example of my pickling or preserving solution is as follows:

1 gallon cider vinegar (full strength)
2 teaspoons saccharine
3 tablespoons table salt
3 tablespoons mustard (dry)
12 tablespoons granulated sugar.

A composition as above described not only is effective in preserving peppers when used in the manner indicated, but also imparts an excellent flavor thereto which does not deteriorate over a long period of standing. Basically, such composition comprises one ounce of saccharine to three gallons of cider vinegar (full strength), one gallon of the resultant solution being sufficient to preserve seven quarts of peppers. In addition to keeping the peppers firm and solid, which is very important from a commercial point of view, the foods thus preserved are much more healthful than those now ordinarily offered on the market. In the first place no harmful preservatives need be included. In the second place, since raw peppers may be thus preserved, there is not the loss of vitamin content which is normally involved in heating and cooking. Furthermore, since saccharine is a powerful sweetening agent, it is not necessary to use a large proportion of sugar for this purpose and peppers thus preserved are therefore suitable for diabetics and others on whom the consumption of appreciable quantities of sugar has a harmful effect.

It will therefore be seen that I have provided a novel method of preserving peppers which not only results in a superior food from the health standpoint but also permits the manufacturer to produce large quantities in season without danger of loss due to deterioration in texture of foods thus processed. I am aware that saccharine has long been employed as a sweetening agent in beverages, desserts, and in canning certain fruits and vegetables. In my new process, however, the saccharine serves primarily as a preservative and hardening agent instead of a sweetening agent, provided it is not heated. Accordingly I employ raw peppers and preserve them without cooking. Not only is cooking unnecessary but heating actually renders the saccharine ineffective to maintain the peppers in firm and solid condition.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. A preserved food comprising the fruit of a member of the capsicum family cold packed in a solution containing vinegar and saccharine as a preserving and hardening agent.

2. A preserved food comprising the fruit of a member of the capsicum family cold packed in a solution of saccharine in cider vinegar.

3. A preserved food comprising raw peppers cold packed in a solution of one ounce of saccharine to three gallons of full strength vinegar.

4. A preserved food comprising raw peppers cold packed in a liquid composition comprising one ounce of saccharine, three gallons of full strength cider vinegar, nine tablespoons table salt, thirty-six tablespoons sugar, and nine tablespoons dry mustard.

5. The method of preserving peppers in firm and solid conditions for an extended period of time which comprises packing such peppers in the raw state in a cold solution of saccharine in vinegar.

6. The method of preserving peppers in firm and solid condition for an extended period of time which comprises packing such peppers in the raw state in a cold solution of one ounce of saccharine to three gallons of full strength cider vinegar.

7. The method of preserving peppers in firm and solid condition for an extended period of time which comprises packing such peppers in the raw state in a cold solution comprising three gallons of full strength cider vinegar, one ounce of saccharine, nine tablespoons table salt, thirty-six tablespoons sugar, and nine tablespoons dry mustard.

8. A preserved food comprising raw peppers cold packed in a liquid solution of saccharine, salt, and sugar in vinegar.

ELSIE A. HAYES.

REFERENCES CITED

The following references are of record in the file of this patent:

UNITED STATES PATENTS

| Number | Name | Date |
|---|---|---|
| 675,601 | Kroell | June 4, 1901 |
| 723,693 | Loder | Mar. 24, 1903 |
| 1,889,123 | Jones | Nov. 29, 1932 |

FOREIGN PATENTS

| Number | Country | Date |
|---|---|---|
| 12,839 | Great Britain | 1911 |